United States Patent [19]
Landoni

[11] Patent Number: 5,472,791
[45] Date of Patent: Dec. 5, 1995

[54] HEAT SHRINKABLE CO-EXTRUDED FILM AND RELEVANT PREPARATION PROCEDURE

[75] Inventor: Guido Landoni, Rho, Italy

[73] Assignee: Soten S.r.l., Milan, Italy

[21] Appl. No.: 142,697

[22] Filed: Oct. 25, 1993

[30] Foreign Application Priority Data

Oct. 30, 1992 [IT] Italy ................... MI92A2506

[51] Int. Cl.⁶ .................................. B32B 27/08
[52] U.S. Cl. ................... 428/516; 428/34.9; 428/910
[58] Field of Search ................ 428/34.9, 516, 428/910

[56] References Cited

U.S. PATENT DOCUMENTS 4,532,189  7/1985  Mueller ................... 428/516
4,863,769  9/1990  Lustig et al. ............. 428/34.9
5,298,302  3/1994  Boice ..................... 428/34.9

*Primary Examiner*—Edith Buffalow
*Attorney, Agent, or Firm*—Hedman, Gibson & Costigan

[57] ABSTRACT

Three-layer heat shrinkable co-extruded film, the intermediate layer consisting of linear low density polyethylene or linear medium density polyethylene, added with hydrogenated hydrocarbon resins or other resins or low molecular weight polyethylene or polypropylene waxes, and the two external layers consisting of polypropylene or ethylene-propylene copolymer added with resins or waxes of the same group as used for the intermediate layer.

10 Claims, 1 Drawing Sheet

HEAT SHRINKABLE CO-EXTRUDED FILM AND RELEVANT PREPARATION PROCEDURE

PRIOR ART

The twin-bubble co-extrusion technique for the production of single-layer or multilayer heat shrinkable films is already known. The films thus obtained find application especially in the packaging sector.

For example, U.S. Pat. No. 4,863,769 (Viskase) discloses the production of a heat shrinkable film, oriented by biaxial stretching in the two longitudinal and transversal directions, consisting of LLDPE (linear low density polyethylene) and α-olefins.

Said film may be single-layer or co-extruded with mixtures containing EVA (ethylene-vinyl acetate copolymer) or LLDPE.

U.S. Pat. No. 4,532,189 (Grace) discloses a three- or five-layer film whose intermediate layer consists of LLDPE or LMDPE (linear medium density polyethylene) added with EVA or EPC (ethylene-propylene copolymer) and whose external layers consist of EPC added with PP (polypropylene) or LLDPE.

This film shows a good tear strength as well as a good heat seal resistance.

The use of hydrocarbon resins to modify PP and EPC is also known.

European patent 00,210,750 (Hercules) claims the obtainment of an antistatic PP film, which may be heat-sealed at low temperature, starting from hydrocarbon resins.

Notwithstanding the good results brought about by the technique already known, the need of films of improved mechanical, optical, and heat sealing properties is felt, in particular in the packaging sector.

SUMMARY

It has surprisingly been found that a three-layer heat-shrinkable co-extruded film having improved characteristics can be obtained by mixing the three-layer constituent polyolefins with suitable additives and by operating under convenient conditions. The intermediate layer of said film consists of LLDPE (linear low density polyethylene) or LMDPE (linear medium density polyethylene) added with resins selected out of the group consisting of hydrogenated hydrocarbon resins, terpene resins, phenolic resins, pine resins, polycyclopentadiene, low molecular weight polyethylene or polypropylene waxes, VLDPE (very low density polyethylene), MA (maleic anhydride polymer), and AE (acrylic ester polymer), ethylene-acrylic ester-maleic anhydride terpolymer, EVA/MA (ethylene-vinylacetate-maleic anhydride terpolymer).

The two external layers of said film consist of PP (polypropylene) or EPC (ethylene-propylene copolymer) added with resins or waxes of the same group as used for the intermediate layer.

The procedure for the preparation of said film comprises the steps of a) mixing of the raw materials in granular form by traditional dry mixers to give the three mixtures for the three film layers to be obtained;

b) co-extruding the three mixtures fed to a die provided with three concentric annular slots;

c) immediate cooling of the tubular film and heating of same by IR rays or hot air at a temperature close to the softening point;

d) film orienting by twin-bubble biaxial stretching;

e) film cooling by air blowing;

f) bubble cutting and film roll winding.

The film obtained according to the present invention exhibits improved characteristics of heat shrinking (%), mechanical resistance, stiffness, transparency and gloss.

DETAILED DESCRIPTION OF THE INVENTION

Figure 1:
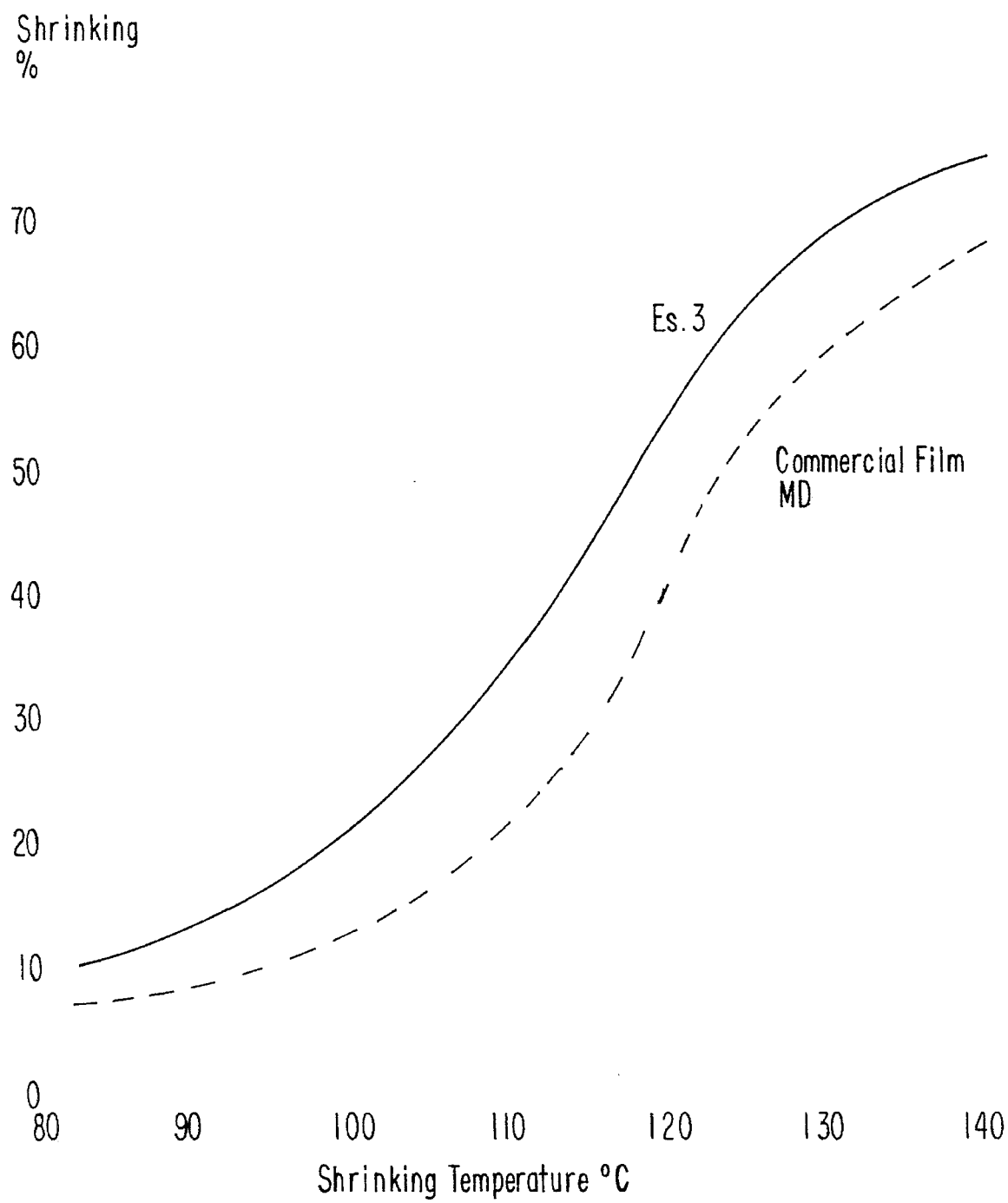

The following detailed description sets forth the characteristics of and the advantages offered by the heat shrinkable co-extruded film as per the present invention and the relevant preparation procedure.

The said film consists of three layers, the intermediate layer consisting of LLDPE (linear low density polyethylene) or LMDPE (linear medium density polyethylene) added with resins selected out of the group consisting of hydrogenated hydrocarbon resins, terpene resins, phenolic resins, pine resins, polycyclopentadiene, low molecular weight polyethylene or polypropylene waxes, VLDPE (very low density polyethylene), MA (maleic anhydride polymer) and AE (acrylic ester polymer) ethylene-acrylic ester-maleic anhydride terpolymer, EVA/MA (ethylene-vinylacetate-maleic anhydride terpolymer).

The two external layers of said film consist of PP (propylene homopolymer) or EPC (ethylene-propylene copolymer) added with resins of waxes of the same group as used for the intermediate layer.

The substances used have the following characteristics:

LLDPE and LMDPE consist of ethylene with 8% max. butene of octene or hexene or α-methyl pentene; VLDPE consists of ethylene added with 10% max. octene and tetramethylpentene or propylene (density 0.890–0.910);

PP is a homopolymer of propylene having density of 0.90 approx. EPC is a copolymer consisting of ethylene and propylene, the latter being the major component;

hydrogenated hydrocarbon resins include hydrogenated aromatic hydrocarbon resins, hydrogenated terpene resins, etc., such as for example the resins obtained by hydrogenating resins produced by polymerization of various unsaturated aromatic hydrocarbons, e.g. styrene, α-methylstyrene, vinyltoluene, vinylxylene, indene, ethyl and/or methyl indene, and terpene. This group also comprises the hydrogenated resins obtained by polymerization of fractions of petroleum cracking by-products with b.p. ranging from 150° C. to 300° C. Polyethylene and polypropylene waxes have a molecular weight ranging from 1,800 and 8,000, are of emulsionizable type and may be oxidized or not oxidized.

The by wt. per cent amount of resins or waxes added to LLDPE or LMDPE for the intermediate layer ranges from 1.0 to 35.

The by wt. per cent amount of resins or waxes added to PP or EPC for the external layers ranges from 2 to 35.

The film preparation procedure comprises the following steps.

Proper proportions of the components in granular form (basic polymers and additives as required for each layer) are mixed.

The three feeders discharge the polymer into a single die provided with three concentric annular slots.

The melted polymer leaves the die as a 3-layer tubular film.

The tubular film, which is still hot, is sized by passing between an outer ring cooled by a liquid coolant, e.g. water at 15°–30° C., and an inner mould, which is also cooled by a liquid coolant, e.g. water at 15°–30° C.

The outer ring provides uniform cooling to the tubular film circumference. The max. temperature variation along the circumference is 1° C.

By internal and external cooling the tubular film temperature drops from 210° C. approx. to 30° C. in 8–25 sec. The water leaving the outer ring adheres, as a liquid film, to the tubular film outer surface and flows to the chamber underneath.

In the next step, the tubular film is oriented by biaxial stretching in the two longitudinal and transversal directions by the twin-bubble technique comprising the following operations.

The cold tubular film is fed to an IR-ray of hot-air oven where it is heated to a temperature close to softening. The tubular film is inflated with compressed air and expanded in the transversal direction. This results in a transversal orientation of the molecules. At the same time, the tubular film is stretched in the longitudinal direction by causing the pull-roll upstream of the oven and the final pull-roll to operate at a different speed.

Once the film has undergone double hot stretching, it is rapidly cooled to stabilize the inner orientation of molecules. Cooling is obtained by blowing air at 5° C. to 15° C.

The operating conditions of primary tubular film cooling, sizing, bubble inflation, and film stabilization ape basic features of the present invention claiming the production of a film with the desired characteristics.

The film obtained according to the claimed procedure is 8 to 60µ thick and exhibits improved characteristics over the product obtained by the known technique.

In particular, the film of the invention exhibits:

shrinking at 120° C.: from 41 to 53%:

mechanical resistance: from 100 to 150N/mm2 stiffness: from 500 to 700N/mm2 transparency: from 90 to 94% gloss: from 100 to 115 photoelectric cell units tearing propagation: from 12 to 18 g;

shrinking strength: from 15 to 35 g/cm.

The shrinking vs. temperature curves plotted in FIG. 1 show the transversal shrinking % of a product as per Example 3 in comparison with a commercial product (MD).

The improved physical and mechanical properties of the film bring about improved technological characteristics, i.e.:

better orientation (higher % stretching at a lower temperature);

better balancing in the two L and T (longitudinal and transversal) directions;

lower shrinking strength even at high per cent shrinking;

better adhesion between layers resulting in a higher heat seal resistance;

better mechanical properties resulting from an excellent orientation;

good optical characteristics.

Thanks to the above characteristics, the film as per the present invention is suitable for the packaging sector in general and in particular for the applications requiring a good film adhesion to the product (boxes, books, magazines, food, vegetables, and multiple packed products), in which sector it shows improved performance over the product of the prior art.

The following examples are conveyed by way of illustration, not of limitation.

EXAMPLE 1 (comparison)

A three-layer (A/B/A) film (where A stands for the external layers and B the intermediate layer) was prepared. Total thickness: 15µ; thickness of A: 2µ; thickness of B: 11µ. Layers A consisted of propylene homopolymer (Moplen S 38 FT produced by HIMONT), melt index 1.8 (230° C., 2.15 kg), added with micronized silicon dioxide (0.5%) and a completely saturated hydrogenated hydrocarbon resin (2%) (molecular weight=900 approx.; Brookfield viscosity=1000 approx.).

The resin used was Eastotac H 130 produced by Eastman Kodak. Layer B consisted of LLDPE (Dowlex NG 5056 produced by Dow Chemical), melt index 1 (190° C., 2.16 kg) and density 0.923. This polymer was added with 1% erucamide (sliding agent). In particular, Constab GL 6004 produced by Constab Co. was used. The temperature of the melted material leaving the die was 190° C. approx. in the case of layer A and 200° C. approx. in the case of layer B. The temperature of internal tubular film cooling water was 24° C., that of the external film coolant being 30° C. The tubular film leaving the die had a diameter of 180 mm. The film was then oriented in the transversal and longitudinal directions under the following conditions:

temperature 170° C.

chamber pull-roll speed: 5 m/min oven pull-roll speed: 5.2 m/min winder pull-roll speed: 26 m/min inflated bubble diameter: 900 mm flat film width: 1415 mm.

The stretching ratio is therefore symmetrical: L×T=5×5.

The film obtained as per the invention exhibits better characteristics than the film obtained according to the prior art. In particular:

thickness is more uniform;

shrinking percentage is higher and more balanced in the two directions L and T;

tensile strength and elongation at break are higher;

tear strength is higher.

The film characteristics are shown in Tables 1, 2, and 3.

EXAMPLE 2

The procedure of Example 1 was repeated using LMDPE instead of LLDPE for the intermediate layer, which, in addition, was added with 2% of hydrogenated hydrocarbon resin Eastotac H130.

LMDPE had melt index of approx. 1 (190° C., 2.16 kg) and density of 0.94.

The film characteristics are shown in Tables 1 and 3.

EXAMPLE 3

The procedure of Example 1 was repeated with minor modifications, i.e. the intermediate layer consisted of LLDPE added with 2% hydrocarbon resin, type Eastotac H 130 produced by Eastman Kodak.

The temperature of the melted material leaving the die was 190° C. in the case of layer B and the bubble orientation temperature was 162° C. approx.

The film characteristics are shown in Tables 1, 2, and 3. In particular, an improved adhesion between layers was found.

EXAMPLE 4

The procedure of Example 2 was repeated using, for the intermediate layer, LMDPE added with 4% hydrogenated hydrocarbon resin, type Eastotac H130 produced by Eastman Kodak.

The film characteristics are shown in Table 1.

EXAMPLE 5

The procedure of Example B was repeated using, for the external layers, EPC, a random propylene-ethylene (ca. 5%) copolymer, having melt index of 3 to 4 (230° C., 2.16 kg) and softening point, Vicat, of approx. 110° C., added with 2% hydrocarbon resin Eastotac H130.

In particular, Moplen SYL 7008 produced by HIMONT was used.

The film characteristics are shown in Tables 1 and 2.

EXAMPLE 6

The procedure of Example 4 was repeated using, for the external layers, EPC, in particular Moplen SYL 7008 produced by HIMONT.

The film characteristics are shown in Table 1.

EXAMPLE 7

The procedure of Example 1 was repeated using, for the intermediate layer, a mixture of 100 parts LLDPE (type Dowlex NG 5056) and 10 parts VLDPE (type Teamex TMX 100 F of DSM) having density of 0.90 and melt index of 1.5.

The film characteristics are shown in Tables 1, 2, and 3.

EXAMPLE 8

The procedure of Example 7 was repeated using EPC for the external layers. In particular, Moplen SYL 7008 added with 2% Eastotac H 130 and 1% Constab GL 6001 was used.

The film characteristics are shown in Table 1.

EXAMPLE 9

The procedure of Example 1 was repeated using, for the intermediate layer, a mixture of LLDPE and an ethylene-acrylic ester-maleic anhydride terpolymer.

In particular, the mixture consisted of 100 parts LLDPE (Dowlex NG 5056) and 10 parts terpolymer (Lotader 2308 produced by Enichem Polimeri), having melt index of 2 (190° C., 2.16 kg) and density of 0.94.

The film characteristics are shown in Table 1.

EXAMPLE 10

The procedure of Example 9 was repeated using EPC added with 2% Eastotac H130 for the external layers.

The film characteristics are shown in Tables 1, 2, and 3.

EXAMPLE 11

The procedure of Example 9 was repeated using, for the internal layer, a mixture of 100 parts LLDPE and 10 parts EVA-maleic anhydride terpolymer, in particular, DuPont's Bynel E 361 (melt index 1).

The film characteristics are shown in Table 1.

EXAMPLE 12

The procedure of Example 11 was repeated using EPC added with 2% of Eastotac H130 for the external layers.

The film characteristics are shown in Tables 1, 2, and 3.

EXAMPLE 13

The procedure of Example 5 was repeated by adding to the internal layer, in this example consisting of LLDPE Clearflex FG308 Enichem, a polypropylene wax having a density of 0.93 and a molecular weight of 4,500 in a ratio of 1.5% in the place of the hydrocarbon resin.

I particular Epolene E43 wax (Eastam Chemical) was added.

The film characteristics are shown in Table 1.

TABLE 1

| Parametes measured | TEST | UNITS | Ex. 1 | Ex. 2 | Ex. 3 | Ex. 4 | Ex. 5 | Ex. 6 |
|---|---|---|---|---|---|---|---|---|
| Light transmission | ASTM D 1033 | % | 94 | 94 | 92 | 92 | 92 | 92 |
| Gloss | D 2457 | photoelec. cell units | 115 | 115 | 115 | 115 | 105 | 105 |
| Shrinking at 120° C. | — | % | L 40 T 46 | 44 50 | 44 52 | 43 50 | 45 51 | 45 51 |
| Shrinking strength | D 2838 | N/mm$^2$ | 70 | 70 | 60 | 62 | 58 | 60 |
| Elastic modulus | D 882 | N/mm$^2$ | 650 | 680 | 660 | 600 | 600 | 610 |
| Tensile strength | D 882 | N/mm$^2$ | 120 | 125 | 120 | 105 | 115 | 118 |
| Elongation at break | D 882 | % | 110 | 110 | 105 | 95 | 105 | 100 |
| Tear strength | D 1938 | g. | 9 | 9 | 10 | 10 | 13 | 12 |

| Parametes measured | TEST | UNITS | Ex. 7 | Ex. 8 | Ex. 9 | Ex. 10 | Ex. 11 | Ex. 12 | Ex. 13 | E* |
|---|---|---|---|---|---|---|---|---|---|---|
| Light transmission | ASTM D 1033 | % | 92 | 92 | 90 | 90 | 90 | 90 | 92 | 90 |
| Gloss | D 2457 | photoelec. cell units | 110 | 105 | 110 | 105 | 110 | 105 | 105 | 100 |

TABLE 1-continued

| | | | | | | | | | | |
|---|---|---|---|---|---|---|---|---|---|---|
| Shrinking at 120° C. | — | % | L 47 T 51 | 48 51 | 47 50 | 48 51 | 48 53 | 49 53 | 50 55 | 45 50 |
| Shrinking strength | D 2838 | N/mm² | 73 | 67 | 80 | 90 | 90 | 86 | 60 | 105 |
| Elastic modulus | D 882 | N/mm² | 590 | 580 | 600 | 590 | 570 | 560 | 600 | 500 |
| Tensile | D 882 | N/mm² | 104 | 98 | 95 | 92 | 93 | 92 | 110 | 92 |
| Elongation at break | D 882 | % | 112 | 118 | 106 | 110 | 112 | 118 | 115 | 120 |
| Tear strength | D 1938 | g. | 17 | 16 | 14 | 17 | 14 | 18 | 15 | 11 |

In all examples, film thickness is of 15μ.
*Reference commercial film Cryovac MD film (W. R. Grace)

TABLE 2

Adhesion between layers

Test method (non-standardized). 20 mm wide strips were transversally cut from the extruded tubular film before inflation. After manual delamination of the internal layers, the force required for layers separation, starting from the delaminated ends was measured by a dynamometer.

| | Ex. 1 | Ex. 3 | Ex. 5 | Ex. 7 | Ex. 10 | Ex. 12 | Ref.* |
|---|---|---|---|---|---|---|---|
| g | 350 | 570 | 600 | 540 | 710 | 730 | 200 |

*Ref. = reference coextruded film formed by layers consisting of propylene homopolymer/LLDPE/propylene homopolymer, obtained according to the procedure described in Example 1 but without hydrocarbon resins addition.

The improved adhesion between layers resulted in an improved heat seal resistance.

TABLE 3

Heat seal resistance

The method (non-standardized) consisted in subjecting 200 mm wide heat-sealed film specimens to elongation at break test. Heat-sealing was obtained by means of a hot wire or strap.

| | Ex. 1 | Ex. 2 | Ex. 3 | Ex. 7 | Ex. 10 | Ex. 12 | E* |
|---|---|---|---|---|---|---|---|
| N/mm 2 | 60 | 78 | 83 | 66 | 81 | 80 | 72 |

E* Reference commercial film. Cryovac MD film (W. R. Grace)

We claim:

1. Three-layered heat-shrinkable coextruded film, the two external layers consisting of PP (polypropylene) or EPC (ethylene-propylene copolymer) blended with resins selected from the group consisting of hydrogenated hydrocarbon resins, terpene resins, phenolic resins, pine resins, polycyclopentadiene, low molecular weight polyethylene or polypropylene waxes, very low density polyethylene (VLDPE), maleic anhydride (MA) polymer, acrylic ester (AE) polymer, ethylene-acrylic ester-maleic anhydride terpolymer and EVA/MA terpolymer and the intermediate layer consisting of linear low density polyethylene (LLDPE) or linear medium density polyethylene (LMDPE) blended with resins or waxes of the same group as used for the external layers.

2. The film according to claim 1 wherein said LLDPE and LMDPE consist of ethylene and 8% max. butene or octene or hexene or α-methyl pentene.

3. The film according to claim 1 wherein said VLDPE consists of ethylene blended with 10% max. octene and tetramethylpentene or propylene, having density of 0.890–0.910.

4. The film according to claim 1 wherein said PP is a propylene homopolymer having density of 0.90 approx.

5. The film according to claim 1 wherein said EPC is a copolymer consisting of ethylene and propylene, the latter being the major component.

6. The film according to claim 1 wherein the by wt. per cent amount of said resins or waxes added to PP or to EPC for the external layers ranges from 2 to 35.

7. The film according to claim 1 wherein the by wt. per cent amount of said resins or waxes added to LLDPE or to LMDPE for the intermediate layer ranges from 1.0 to 35.

8. The film according to claim 1 wherein shrinking at 120° C. ranges from 41 to 53%, mechanical resistance from 100 to 150 N/mm2, stiffness from 500 to 700 N/mm2, transparency from 90 to 93%, gloss from 100 to 115 photoelectric cell units, tearing propagation from 12 to 18 g, shrinking strength from 15 to 35 g/cm.

9. Three-layered heat-shrinkable coextruded film, the two external layers consisting of PP (polypropylene) or EPC (ethylene-propylene copolymer) blended with 2 to 35 wt. percent of resins selected from the group consisting of hydrogenated hydrocarbon resins, terpene resins, phenolic resins, pine resins, polycyclopentadiene, low molecular weight polyethylene or polypropylene waxes, very low density polyethylene (VLDPE), maleic anhydride (MA) polymer, acrylic ester (AE) polymer, ethylene-acrylic ester-maleic anhydride terpolymer and EVA/MA terpolymer and the intermediate layer consisting of linear low density polyethylene (LLDPE) or linear medium density polyethylene (LMDPE) added with 1.0 to 35 wt. percent of resins or waxes of the same group as used for the external layers.

10. A film as defined in claim 9 wherein the external layer is ethylene-propylene copolymer having 5% ethylene which is blended with 2 weight % of a saturated hydrocarbon wax resin and the core layer is linear low density polyethylene having 10 weight % of n-octene.

* * * * *